United States Patent
Bhatt

(10) Patent No.: US 8,320,656 B1
(45) Date of Patent: Nov. 27, 2012

(54) AUTOMATIC CREATION OF AFTER-THE-FACT PAYROLL JOURNAL

(75) Inventor: Patanjali Bhatt, Cupertino, CA (US)

(73) Assignee: Intuit Inc., Mountain View, CA (US)

(*) Notice: Subject to any disclaimer, the term of this patent is extended or adjusted under 35 U.S.C. 154(b) by 308 days.

(21) Appl. No.: 12/848,079

(22) Filed: Jul. 30, 2010

(51) Int. Cl.
*G06K 9/00* (2006.01)
*G06Q 40/00* (2012.01)

(52) U.S. Cl. .................. 382/138; 382/321; 235/379

(58) Field of Classification Search .......... 382/100–103, 382/112–114, 135–140, 155, 162, 168, 173, 382/181, 186–189, 193, 219, 232, 254, 274, 382/276, 287, 305, 312, 318–321; 235/440, 235/379; 705/37, 35, 38; 706/50
See application file for complete search history.

(56) References Cited

U.S. PATENT DOCUMENTS

| | | | |
|---|---|---|---|
| 6,115,709 A * | 9/2000 | Gilmour et al. ................. | 706/50 |
| 6,658,393 B1 * | 12/2003 | Basch et al. ................... | 705/38 |
| 7,287,689 B2 * | 10/2007 | Tidwell et al. ............... | 235/379 |
| 7,398,925 B2 * | 7/2008 | Tidwell et al. ............... | 235/440 |
| 7,640,205 B2 * | 12/2009 | Michelassi et al. ............ | 705/37 |
| 8,103,566 B1 * | 1/2012 | Petruzzi .......................... | 705/35 |

* cited by examiner

*Primary Examiner* — Seyed Azarian
(74) *Attorney, Agent, or Firm* — Osha Liang LLP

(57) ABSTRACT

A method for creating an after-the-fact (ATF) payroll journal, including identifying a payroll check cashed at a financial institution, where the payroll check is issued to an employee during a payroll period for payment via a financial institution, obtaining, using a processor of a computer system, an electronic image associated with the payroll check, extracting, using the processor, payroll check information from the electronic image, validating, using the processor, the payroll check information based on a pre-determined criterion, where the payroll check information includes a payee name, a check date, and a check amount, and generating, using the processor, an entry of the ATF payroll journal from the payroll check information based on a pre-determined payroll rule, where the entry includes an amount of tax withholding of the employee for the payroll period.

23 Claims, 7 Drawing Sheets

AUTOMATIC CREATION OF AFTER-THE-FACT PAYROLL JOURNAL

CROSS-REFERENCE TO RELATED APPLICATIONS

The present application contains subject matter that may be related to the subject matter in the U.S. application with the Ser. No. 12/848,076, entitled "METHOD AND APPARATUS FOR CREATING CASH-DISBURSEMENT JOURNALS IN AN ACCOUNTING SYSTEM", filed on Jul. 30, 2010, and assigned to the assignee of the present application.

BACKGROUND

An employer that manually pays employees typically does not account for (e.g., record in a log or enter into an accounting journal) accurate employer's tax obligations when determining paycheck amounts and issuing each of the paychecks (i.e., payroll checks). In such cases, creating payroll journals including entries for an employer's tax obligations is performed at a later time and is a time-consuming step in preparing a compiled financial statement. This task is an after-the-fact (ATF) payroll activity, and is a complicated task for the accountant due to the need to calculate the employer's portion of various tax obligations, such as federal tax withholding, Federal Insurance Contribution Act (FICA) tax, federal unemployment tax (FUTA), state tax withholding, state disability insurance (SDI) tax, state unemployment tax (SUTA), etc. This calculation is cumbersome, complex, error prone, and relies heavily on employee wages being recorded correctly. Therefore, cross-checking information provided by the employer is an important requirement of the ATF payroll workflow.

SUMMARY

In general, in one aspect, the invention relates to a method for creating an after-the-fact (ATF) payroll journal, including identifying a payroll check cashed at a financial institution, where the payroll check is issued to an employee during a payroll period for payment via a financial institution, obtaining, using a processor of a computer system, an electronic image associated with the payroll check, extracting, using the processor, payroll check information from the electronic image, validating, using the processor, the payroll check information based on a pre-determined criterion, where the payroll check information comprises a payee name, a check date, and a check amount, and generating, using the processor, an entry of the ATF payroll journal from the payroll check information based on a pre-determined payroll rule, where the entry comprises an amount of tax withholding of the employee for the payroll period.

In general, in one aspect, the invention relates to a system for creating an after-the-fact (ATF) payroll journal, including a memory storing instructions; a processor operatively coupled to the memory; a financial management application (FMA) executing on the processor and configured to manage payroll data of an employer; an after-the-fact (ATF) payroll analyzer executing on the processor configured to execute instructions to receive, from a user representing the employer, information identifying a payroll check issued to an employee of the employer during a payroll period for payment via a financial institution, obtain an electronic image associated with the payroll check, extract payroll check information from the electronic image, and validate the payroll check information based on a pre-determined criterion, where the payroll check information comprises a payee name, a check date, and a check amount; an ATF payroll generator executing on the processor configured to execute instructions to generate an entry of the ATF payroll journal from the payroll check information based on a pre-determined payroll rule, where the entry comprises an amount of tax withholding of the employee during the payroll period, and transmit the ATF payroll journal to the FMA as payroll data; and a repository configured to store the electronic image, the payroll check information, and the ATF payroll journal.

In general, in one aspect, the invention relates to a computer readable storage medium storing instructions for creating an after-the-fact (ATF) payroll journal, the instructions when executed by a computer including functionality to identify a payroll check cashed at a financial institution, where the payroll check is issued to an employee during a payroll period for payment via a financial institution, obtain an electronic image associated with the payroll check, extract payroll check information from the electronic image, validate the payroll check information based on a pre-determined criterion, where the payroll check information comprises a payee name, a check date, and a check amount, and generate an entry of the ATF payroll journal from the payroll check information based on a pre-determined payroll rule, where the entry comprises an amount of tax withholding of the employee for the payroll period.

Other aspects of the invention will be apparent from the following description and the appended claims.

DETAILED DESCRIPTION

Figure 1:
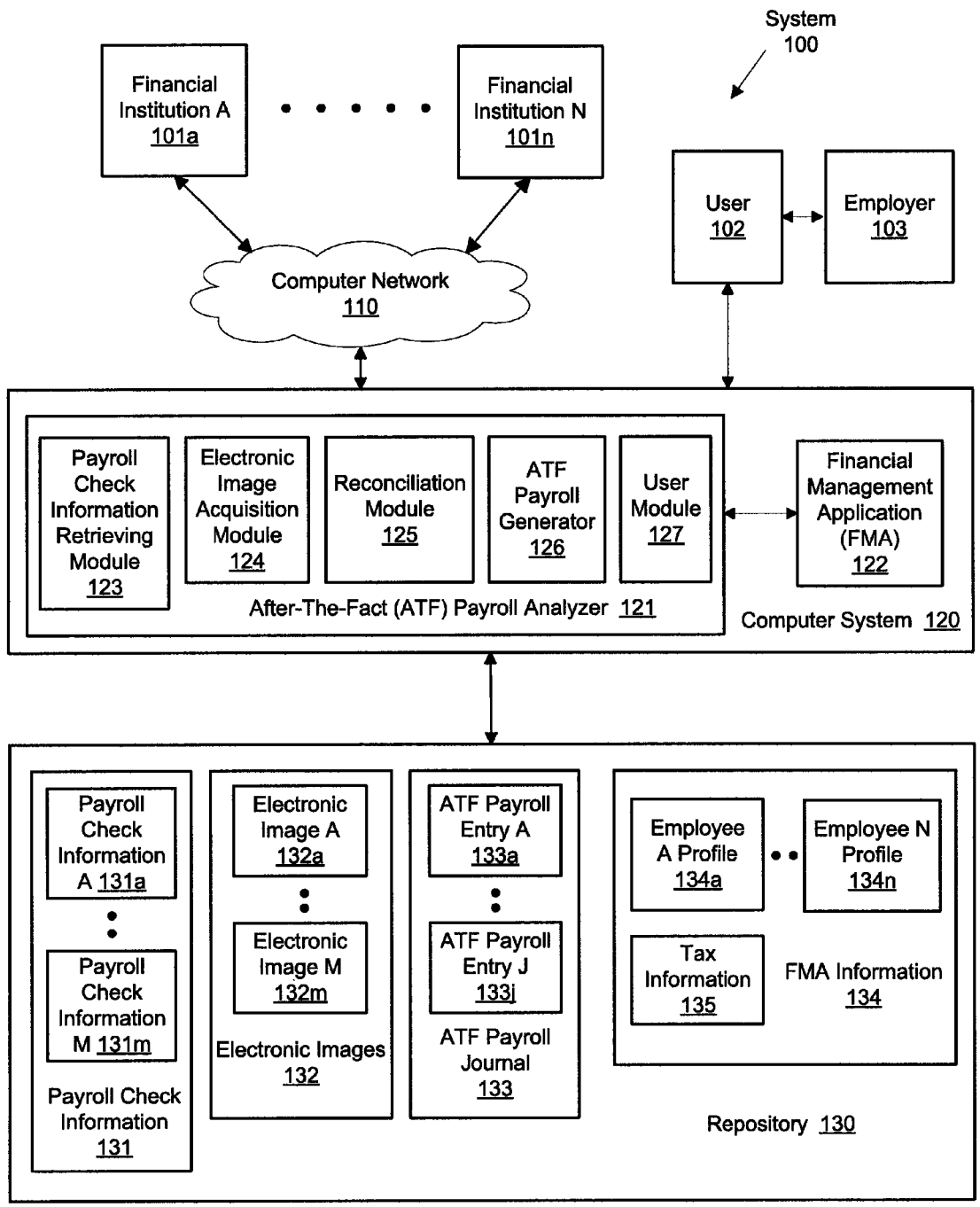
FIG. 1 depicts a schematic block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Generally speaking, an ATF payroll entry is an accounting record maintained by an employer that includes a gross wage, one or more employee's tax withholdings (e.g., federal tax withholding, employee portion of the FICA tax, state tax withholding, etc.), one or more employer's tax obligations (e.g., employer portion of the FICA tax, FUTA, SDI, SUTA, etc.), and a net employee's payment (i.e., corresponding to the amount of the issued paycheck). Each of the components in the ATF payroll entry above may include one or more credit or debit entries to applicable accounts (e.g., Cash account, Payroll Liability account, etc.). Various different formats of the ATF payroll entry may be used in accounting practice while meeting regulatory requirements. Typically, the ATF payroll journal includes multiple ATF payroll entries with one ATF payroll entry for each employee during each accounting period (e.g., monthly period, quarterly period, etc.). Examples of ATF payroll entries are described in reference to FIGS. 3C and 3D below.

Generally speaking, embodiments of the invention generate the ATF payroll journal automatically from payroll check information. Accordingly, potential human errors and associated penalties from tax entities are eliminated while expediency is improved.

In one or more embodiments, the ATF payroll entries are generated for an employer using paycheck information extracted (e.g., using optical character recognition (OCR) techniques) from check images. For example, the check images may be obtained using electronic scanning of a collection of check stubs (i.e., a portion of issued paychecks retained by the employer) or physical cashed checks (i.e., cashed paychecks returned to the employer from the issuing financial institution). Alternatively, the check images may be downloaded from the issuing financial institution of the paychecks (e.g., a bank issuing checks used for writing the paychecks by the employer to pay the employee wages).

Figure 3A:
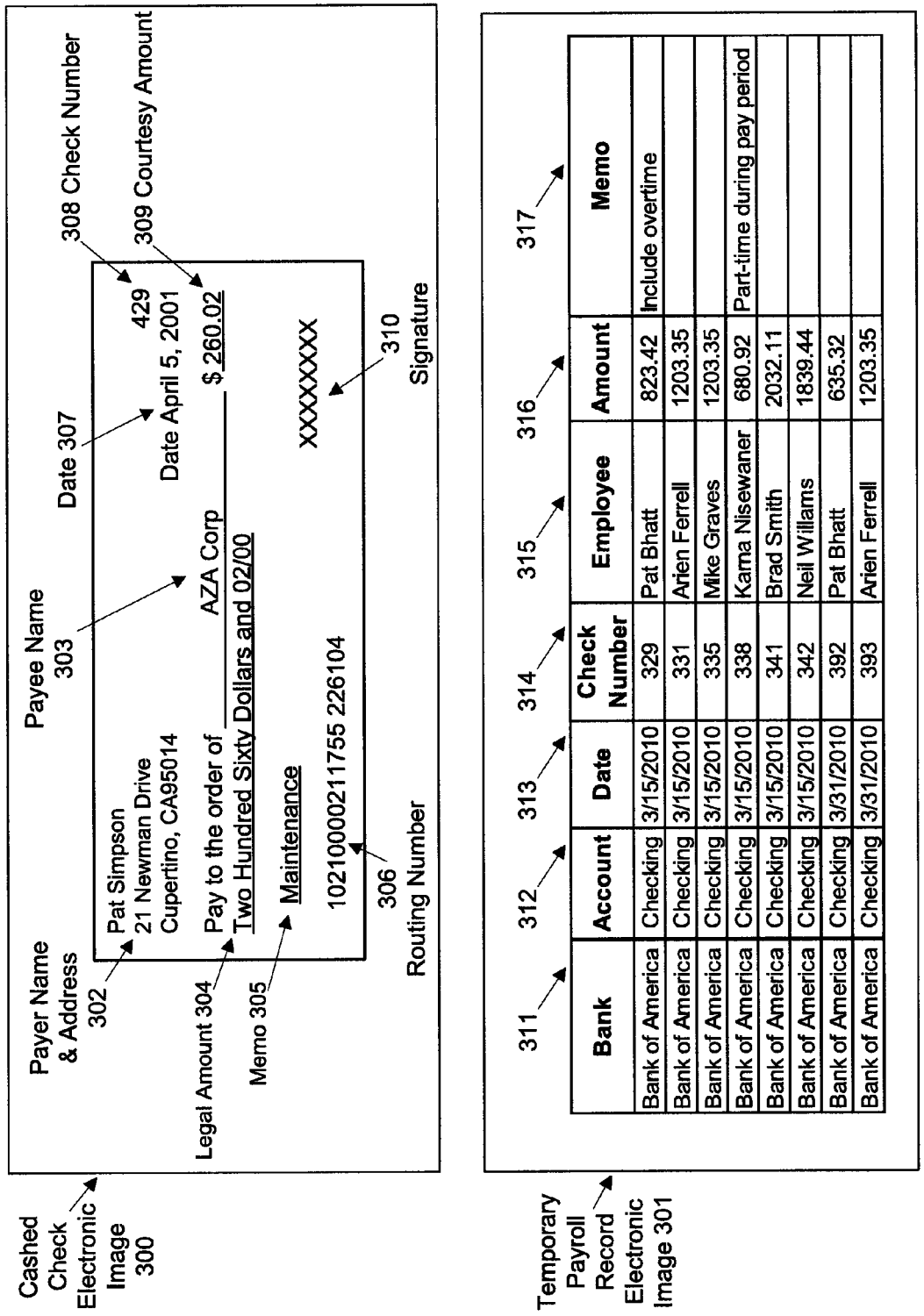
FIGS. 3A through 3D depict an application example in accordance with one or more embodiments of the invention.

In one or more embodiments, the ATF payroll entries are generated for an employer using check information extracted (e.g., using optical character recognition (OCR) techniques) from a hand written payment journal (e.g., a manually created paycheck log) recording each issued paycheck. Alternatively, in one or more embodiments, the ATF payroll entries are generated for an employer using check information retrieved from an electronic payment journal (e.g., paycheck log in a spreadsheet or other tabular format created using a computer program) recording each issued paychecks. An example cashed check and example paycheck log are shown in FIG. 3A below.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be limited to the specific arrangement of modules shown in FIG. 1.

As shown in FIG. 1, the system (100) includes financial institutions (e.g., financial institution A (101a), financial institution N (101n)) and computer system (120) coupled via computer network (110). For example, the computer network (110) may include wired and/or wireless portions of the Internet and/or other data communications networks such as wide area networks (WANs), local area networks (LANs), etc. Further, the computer system (120) is configured to execute financial management application (FMA) (122) and ATF payroll analyzer (121). The FMA (122) and ATF payroll analyzer (121) may be software applications installed onto the computer system (120) and executed by hardware associated with the computer system (120), such as a processor. The ATF payroll analyzer (121) includes payroll check information retrieving module (123), electronic image acquisition module (124), reconciliation module (125), ATF payroll generator (126), and user module (127). Each of the aforementioned components of the ATF payroll analyzer (121) is described below.

The system (100) also includes repository (130) operatively coupled to the computer system (120). The repository (130) may be used for storing payroll check information (131) (e.g., payroll check information A (131a), payroll check information M (131m)). The repository (130) is also configured to store electronic images (132) (e.g., electronic image A (132a), electronic image M (132m)), an ATF payroll journal (133) (e.g., ATF payroll entry A (133a), ATF payroll entry J (133j)), and FMA information (134). FMA information (134) may include employee profiles (e.g., employee A profile (134a), employee N profile (134n)) and tax information (e.g., tax information (135)). In one or more embodiments, the repository (130) is a persistent storage device (or set of devices) and is configured to store data for use by the ATF payroll analyzer (121) and the FMA (122). The repository (130) (and/or any of the payroll check information (131), electronic images (132), ATF payroll journal (133), and FMA information (134) stored therein) may be a data store such as a database, a file system, one or more data structures (e.g., arrays, link lists, tables, hierarchical data structures, etc.) configured in a memory, an extensible markup language (XML) file, any other suitable medium for storing data, or any combination thereof. The repository (130) may be a device internal to the computer system (120). Alternatively, the repository (130) may be an external storage device operatively connected to the computer system (120).

Further as shown in FIG. 1, the system (101) includes a user (102) associated with an employer (103) whose business operations (e.g., payroll and tax filing activities) are managed using the FMA (122). Generally speaking, the employer (103) may be a small business, a corporation, a large company, etc., while the user (102) may be an individual representing the employer (103), such as a sole proprietor and/or small business owner (SBO) of the small business employer (103), an officer of an corporation employer (103) or a large company employer (103), or an individual (e.g., accountant) employed by or otherwise associated with the employer (103). Further, the financial institutions (e.g., financial institution A (101a), financial institution N (101n)) may be a bank, a credit union, or any other suitable financial organization configured to issue checks for the employer (103) to write paychecks to pay employee wages. In particular, each of the financial institutions (e.g., financial institution A (101a), financial institution N (101n)) typically includes a computer (not shown) for executing software applications to perform necessary tasks for issuing checks and providing related information among other financial institution operations.

In one or more embodiments of the invention, the computer system (120) may be operated by the user (102) for accessing functionalities of the FMA (122) and the ATF payroll analyzer (121). In one or more embodiments, the computer system or a portion thereof may be operated by an application service provider offering services using which the user (102) may access the functionalities of the FMA (122) and/or the ATF payroll analyzer (121).

Turning to each of the components within the system (120), in one or more embodiments of the invention, the FMA (122) is configured to manage business activities of the employer (103) based on the FMA information (134) stored in the repository (130). For example, in one or more embodiments, the business activities may include personnel activity of hiring employees, payroll activity of paying employee wages, tax activity of reporting and filing tax returns, etc. An example of the FMA (122) may be Quickbooks™ software provided by Intuit Corporation of Mountain View, Calif.

Generally speaking, the aforementioned business activities result in various financial records tracked by the FMA (122). For example, information of each employee may be tracked using an employee profile that may include name, address, phone number, starting date, citizenship, social security number, birth date, tax withholding status, etc. Specifically, employee A profile (134a) and employee N profile (134n) may include tax withholding status elected by employee A (not shown) and employee N (not shown), respectively. In addition, the aforementioned business activities result in various tax obligations of the employer (103) that are tracked as tax information (135) within the FMA (122). Generally, tax information (135) includes tax obligations (e.g., employee tax withholding, FICA tax, FUTA, SUTA, SDI, etc.) to tax entities (e.g., IRS, EDD, State Franchise Board, etc.). Specifically, tax information (135) may include calculated tax liabilities and payment information corresponding to various tax filings and payments of the employer (103).

In one or more embodiments of the invention, the ATF payroll analyzer (121) or a portion thereof may be a stand alone software in communication with the FMA (122), a user installable add-on module of the FMA (122), an optional functional module within the FMA (122), or a standard feature built-in within the FMA (122). In one or more embodiments of the invention, the ATF payroll analyzer (121) or a portion thereof and the FMA (122) may be executable on a single computer or a combination of separate server and client computers. In one or more embodiments of the invention, the ATF payroll analyzer (121) may be provided by a provider of the FMA (122) or by a third party separate from the provider of the FMA (122).

In one or more embodiments of the invention, the ATF payroll analyzer (121) includes the user module (127) that is configured to receive input from the user (102) for activating and/or adjusting various components of the ATF payroll analyzer (121). In one or more embodiments, the user module (127) is configured to receive information (e.g., from user (102)) identifying one or more payroll checks issued to one or more employees (not shown) of the employer (103) during a payroll period for payments via one or more financial institutions (e.g., financial institution A (101*a*), financial institution N (101*n*), etc.). For example, payroll checks issued to all employees during a particular payroll period may be identified. In one or more embodiments, the user module (127) is configured to determine whether payroll check information is available from a computer of the financial institution (e.g., financial institution A (101*a*), financial institution N (101*n*), etc.) issuing the payroll checks or available from a computer file comprising the payment journal (e.g., spreadsheet or other tabular forms) maintained by the employer (103). For example, such a determination may be based on input from the user (103) or on direct communication with the aforementioned financial institution computer.

The payroll check information may include a payee name, a check date, a check amount, a check number, a financial institution routing number (i.e., ABA number), payer information, a signature, or combinations thereof. In one or more embodiments, such payroll check information may accessible from the aforementioned financial institution computer, for example based on open financial exchange (OFX) protocol, which is a data-stream format for exchanging financial information known to those skilled in the art.

In the case where it is determined that the payroll check information is accessible from the aforementioned financial institution computer, the user module (127) may receive information identifying one or more payroll checks by directly identifying the corresponding payroll check information. In the case where it is determined that the payroll check information is available from the aforementioned computer file, the user module (127) may receive information identifying one or more payroll checks by directly identifying the corresponding portion of the payment journal in the computer file.

Alternatively, in the case where it is determined that the payroll check information is not accessible from the aforementioned financial institution computer (e.g., OFX is not supported) or unavailable from the aforementioned computer file (e.g., the payment journal may not be in electronic format), the user module (127) may receive information identifying a collection of cashed paychecks returned from the issuing institution (e.g., financial institution A (101*a*), financial institution N (101*n*), etc.), a collection of pay stubs of issued paychecks, a collection of cashed check images accessible from the aforementioned financial institution computer (e.g., based on an online account of the employer (103)), a portion of a physical payment journal (not shown) recording issued payroll checks, or combinations thereof. Examples of the payroll check information and payment journal are described in reference to FIG. 3A below.

In one or more embodiments of the invention, the ATF payroll analyzer (121) includes the electronic image acquisition module (124) configured to obtain (e.g., using optical scanning techniques) electronic images of the identified cashed payroll checks, retained check stubs, or the portion of the payment journal described above in response to identification thereof by the user module (127). In one or more embodiments of the invention, the electronic image acquisition module (124) is configured to obtain (e.g., via the computer network (110)) identified cashed check images directly if available from the aforementioned issuing financial institution computer (not shown). In one or more embodiments, such electronic images are stored in the repository (130) as the electronic images (132). For example, the electronic images (132) may include a scanned image of a cashed payroll check or check stub as the electronic image A (132*a*) and/or a scanned image of a portion of the payroll journal as the electronic image M (132*m*).

In one or more embodiments of the invention, the ATF payroll analyzer (121) includes the payroll check information retrieving module (123) that is configured to obtain payroll check information from the electronic images (132). In such embodiments, the payroll check information retrieving module (123) may be configured with optical character recognition (OCR) and optical hand writing recognition capabilities for extracting the payroll check information from the electronic images (132). Examples of extracting the payroll check information from cashed check image and payment journal image are described in reference to FIG. 3A below.

In one or more embodiments, the payroll check information retrieving module (123) is configured to obtain payroll check information from the aforementioned issuing financial institution computer (not shown) directly if determined to be available, for example via the computer network (110) based on OFX protocol. In one or more embodiments, the payroll check information retrieving module (123) is configured to obtain payroll check information from the aforementioned payment journal in an electronic format (e.g., spreadsheet or other tabular forms) if determined to be available.

In one or more embodiments of the invention, the ATF payroll analyzer (121) includes the reconciliation module (125) that is configured to validate the payroll check information based on a pre-determined criterion. For example, the reconciliation module (125) may be configured to validate the payroll check information by comparing the payee name to an employee list, comparing the check date to a payroll period, comparing a legal amount of the check amount and a courtesy amount of the check amount, comparing the routing number to a profile of the financial institution, and/or comparing the payer information and/or the signature to employer records (e.g., maintained in the FMA (122)). In one or more embodiments, the reconciliation module (125) may be configured to present the comparisons to the user (102) for manual reconciliation when the comparison indicates a discrepancy. An example of manual reconciliation is described in reference to FIG. 3B below.

In one or more embodiments, the results generated by the reconciliation module (125) are presented to the user (102) using a display device (not shown) of the computer system (120). Accordingly, the ATF payroll journal (133) is generated in response to the comparisons indicating no discrepancy or otherwise completion of the manual reconciliation.

In one or more embodiments of the invention, the ATF payroll analyzer (121) includes the ATF payroll generator (126) that is configured to generate an entry (e.g., ATF payroll entry A (133a), ATF payroll entry J (133j)) of the ATF payroll journal (133) from the payroll check information based on a pre-determined payroll rule. For example, the payroll rules may specify the particular content and format of the ATF payroll entry as an accounting record. In particular, such accounting record may include associated credit and debit entries to applicable accounts. For example, the payroll rule may specify the ATF payroll entry to include a gross wage, one or more employee's tax withholdings (e.g., federal tax withholding, employee portion of the FICA tax, state tax withholding, etc.), one or more employer's tax obligations (e.g., employer portion of the FICA tax, FUTA, SDI, SUTA, etc.), and a net employee's payment (i.e., corresponding to the amount of the issued paycheck) as well as one or more account for applying applicable credit entries and debit entries. An example payroll rule is described in reference to FIGS. 3C and 3D below.

In one or more embodiments of the invention, the ATF payroll generator (126) is configured to identify an employee by comparing the payee name to an employee list, obtain a profile of the employee in response to identifying the employee, identify the payroll period based on the check date, calculate the amount of tax withholding of the employee for the payroll period based on the check amount and the profile of the employee, and calculate an amount of payroll tax based at least on the amount of tax withholding of the employee. Further, the ATF payroll generator (126) is configured to extract, from the electronic image, check memo information associated with the payroll check and annotate the entry of the ATF payroll journal based on the check number, the electronic image, the check memo information, other pertinent information, or combinations thereof.

In one or more embodiments of the invention, the ATF payroll generator (126) is configured to transmit the ATF payroll journal (133) to the FMA (122) as payroll data and facilitate payment of the payroll tax. Specifically, facilitating payment of the payroll tax includes generating a payroll tax electronic check for automatic payroll tax payment and submitting the payroll tax electronic check to a tax authority.

In one or more embodiments of the invention, payroll check images may be downloaded from the issuing bank of the payroll checks, created from scanning a cashed check returned to the employer after being cashed at the issuing bank, or from scanning a check stub retained by the employer while issuing the payroll check. The images are then processed using OCR technology to extract all payee (employee) details. Each employee may then be looked-up in a database to retrieve a payroll tax profile including information such as withholdings, exemptions, state of residence, etc. Using pre-determined tax rules, the employer's tax obligations are computed for each particular employee, based on the net wage payment reflected by the payroll check amount. Depending upon the particular format the accountant choose to make entries to the ATF journal, for the particular pay period, an entry against Payroll Liabilities can be made for each employee or a total of Payroll Liabilities can be maintained in summary for a single entry to be made at the end of processing all cashed payroll checks.

In one or more embodiments, cashed payroll checks are scanned using a check scanning device. In one or more embodiments, payroll check images are downloaded along with online banking records. In one or more embodiments, a payroll check stub is scanned using a check scanning device or any other scanner. In any of these embodiments, the accounting and tax-obligation calculations may follow the same procedures.

Figure 2:
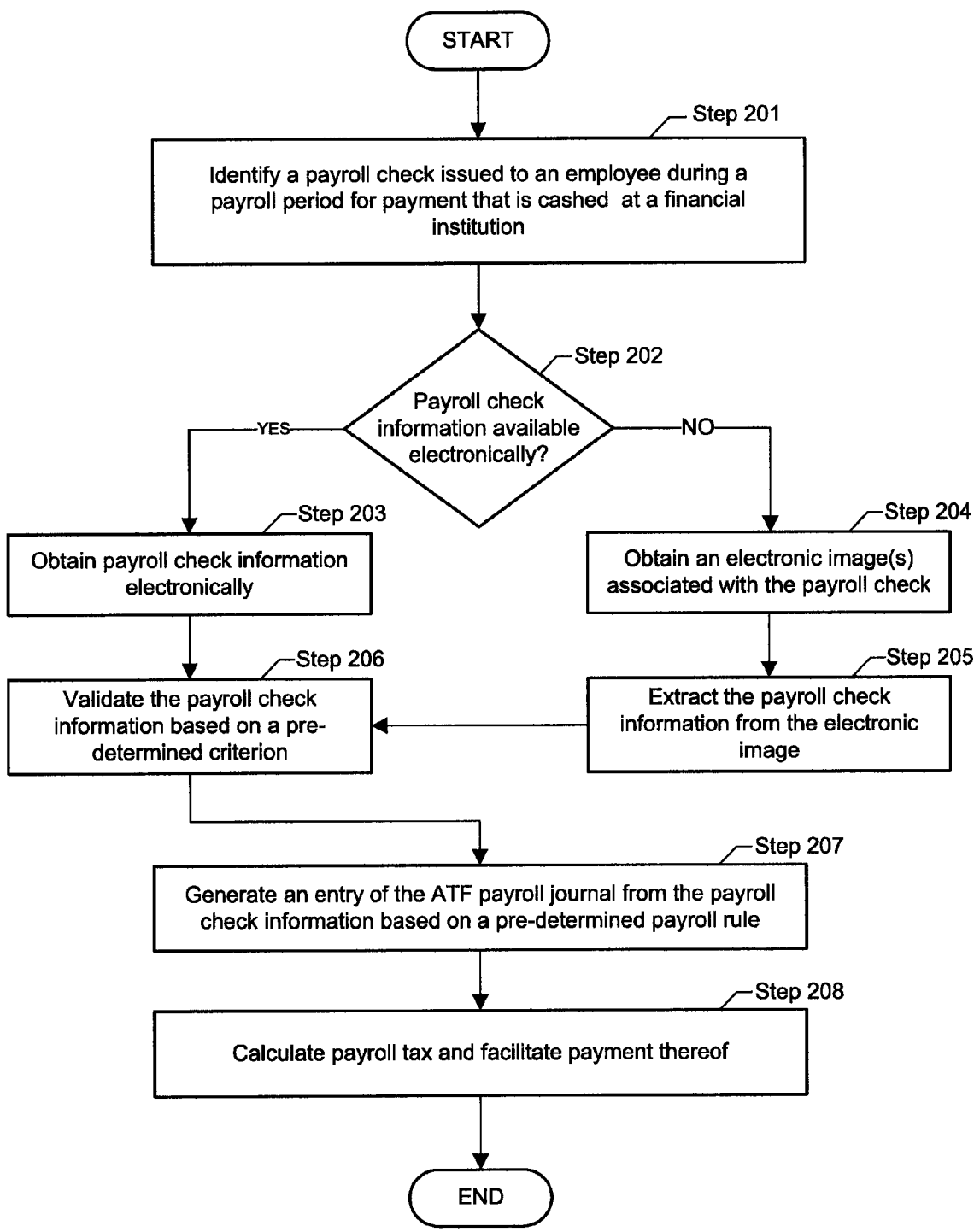
FIG. 2 depicts a flowchart of a method in accordance with one or more embodiments of the invention.

FIG. 2 depicts a flowchart of a method for generating ATF payroll journal in accordance with one or more embodiments of the invention. In one or more embodiments of the invention, one or more of the steps shown in FIG. 2 may be omitted, repeated, and/or performed in a different order. Accordingly, embodiments of the invention should not be limited to the specific arrangements of steps shown in FIG. 2.

In one or more embodiments, the method depicted in FIG. 2 may be used by an employer to generate the ATF payroll journal and may be practiced using a system such as that described with respect to FIG. 1 above.

Initially in Step 201, a payroll check cashed at a financial institution is identified. The payroll check is issued to an employee during a payroll period for payment via a financial institution. For example, the financial institution may be a bank, a credit union, or other banking institution configured for check issuing. In one or more embodiments of the invention, payroll checks for all employees during a particular payroll period are identified. For example, the payroll period may be a week, a two week period, a month, a quarter, etc., when the payroll is performed weekly, bi-weekly, monthly, quarterly, etc., respectively. Next, a determination is made in Step 202 regarding whether payroll information is available electronically. Generally, the payroll check information includes a payee name, a check date, a check amount, a check number, a financial institution routing number (i.e., ABA number), payer information, a signature, or combinations thereof. For example, a computer of the financial institution may be contacted to determine if such payroll check information is available based on OFX protocol, in which case the payroll checks for all employees in the particular payroll period may be directly identified by specifying the corresponding payroll check information provided by the financial institution. In another example, a payment journal maintained by the employer for recording payroll check issuance may exist in electronic format, in which case, the payroll checks for all employees in the particular payroll period may be directly identified by specifying the corresponding section in the payment journal.

In the case where it is determined in Step 202 that the payroll check information is not accessible from the aforementioned financial institution computer (e.g., not supporting OFX) or available from the aforementioned payment journal (e.g., may not be in electronic format), the payroll checks for all employees in the particular payroll period may be identified as a collection of cashed paychecks returned from the financial institution, a collection of pay stubs of issued payroll checks, a collection of cashed check images accessible from the aforementioned financial institution computer (e.g., based on an online account of the employer), a portion of a physical payment journal recording issued payroll checks, or combinations thereof. As noted above, examples of the payroll check information and payment journal are described in reference to FIG. 3A below.

Returning to Step 202, if it is determined that the payroll check information is available electronically, the method proceeds to Step 203 where the payroll check information is obtained, for example, from the computer of the financial institution or from the computer file containing the payment journal recording the payroll check issuance. Subsequently, the method proceeds to Step 206.

In another scenario of Step 202, if it is determined that the payroll check information is not available electronically, the method proceeds to Step 204 where electronic images are obtained for (1) a portion of the physical payment journal recording issued payroll checks, (2) the aforementioned collection of cashed paychecks returned from the financial institution, pay stubs of issued payroll checks, cashed check images accessible from the aforementioned financial institution computer based on an online account of the employer, or (3) any combination thereof.

In Step 205, payroll check information is extracted from the electronic images obtained in Step 204 above. For example, a payee name, a check date, a check amount, a check number, a financial institution routing number (i.e., ABA number), payer information, a signature, etc. maybe extracted using optical scanning and optical character/handwriting recognition techniques from the cashed payroll check image, the pay stub image, the payment journal image, or any combination thereof. Subsequently, the method proceeds to Step 206.

Those skilled in the art will appreciate that Step 203 and a combination of Steps 204 and 205 may be performed in parallel, or in series, as some information may be electronic, while other information may be extracted from electronic images.

In Step 206, the payroll check information obtained in the Step 203 or Step 205 is validated based on a pre-determined criterion. For example, the pre-determined criterion may specify to validate the payroll check by any combination of comparing the payee name to an employee list, comparing the check date to a payroll period, comparing a legal amount of the check amount and a courtesy amount of the check amount, comparing the routing number to a profile of the financial institution, comparing the payer information and/or the signature to employer records maintained in a financial management application (FMA) used by the employer. Further, the pre-determined criterion may further specify to perform manual reconciliation when the validation results generated above indicate a discrepancy.

In Step 207, an entry of the ATF payroll journal is generated from the payroll check information based on a pre-determined payroll rule. In particular, the ATF payroll journal is generated in response to the payroll check information being validated or manual reconciliation thereof being completed in Step 206 above. In one or more embodiments of the invention, the pre-determined payroll rule may specify generating the ATF payroll entry by identifying an employee by comparing the payee name to an employee list, obtaining a profile of the employee in response to identifying the employee, identifying the payroll period based on the check date, and calculating the amount of tax withholding of the employee for the payroll period based on the check amount and the profile of the employee. Specifically, the pre-determined payroll rule may specify the particular content and format of the ATF payroll entry as an accounting record as noted above that includes a gross wage, one or more employee's tax withholdings (e.g., federal tax withholding, employee portion of the Medical tax, state tax withholding, etc.), one or more employer's tax obligations (e.g., employer portion of the Medical tax, FUTA, SDI, SUTA, etc.), and a net employee's payment (i.e., corresponding to the amount of the issued paycheck). As noted above, an example payroll rule with allocation to applicable credit and debit accounts is described in reference to FIGS. 3C and 3D below.

Further, generating the ATF payroll entry may include annotating the entry based on the check number, the electronic image, the check memo information, other pertinent information, or any combination thereof. In one or more embodiments, the ATF payroll journal generated in Step 207 is transmitted (e.g., via a shared data repository) to the FMA used by the employer as payroll data.

In Step 208, an amount of payroll tax is calculated based on the amount of tax withholding of the employee and other pertinent information, for example, specified in the pre-determined payroll rule. In one or more embodiments, the payroll tax may be calculated using computation functionalities of the FMA. Further in Step 208, payment of the payroll tax may be facilitated by generating a payroll tax electronic check for automatic payroll tax payment based on the amount of the payroll tax and submitting the payroll tax electronic check to a tax authority (e.g. Internal Revenue Service (IRS), State Franchise Board, Employee Development Department (EDD). etc.).

FIGS. 3A through 3D depict elements of an application example in accordance with one or more embodiments of the invention. For example, these elements may be used by the system and/or method described in reference to FIGS. 1 and 2 above.

In the application example depicted in FIGS. 3A through 3D, an accountant is able to download online banking (OLB) data as well as scan cashed payroll checks or other source documents such as payroll check stub or hand written payment journal recording payroll check issuances. The software program implementing the present invention may be used to extract the identified payroll transactions from OLB check images and reconcile such transaction information with the hardcopies/electronic source documents (e.g., employee list, employee profile, bank profile, etc.) provided by the employer. Once reconciled, entries are automatically made to the general ledger. The end result is that the accountant user performs minimum data entry while most information is extracted for the user automatically.

As shown in FIG. 3A, the cashed check (also referred to as cancelled check) electronic image (300) may be downloaded from OLB account at the bank used by the employer to issue payroll checks or obtained by physically scanning returned cashed checks from the bank. Those skilled in the art will recognize that the electronic image (300) includes payer name and address (302), payee name (303), legal amount (304) of the check amount, memo line (305), bank routing number (306), check date (307), check number (308), courtesy amount (309) of the check amount, and signature (310). As described above in reference to FIGS. 1 and 2 above, payroll check information may be extracted from the cashed check electronic image (300) using optical character recognition and optical handwriting recognition techniques. Those skilled in the art will appreciate that such a recognition result of the image (300) may be associated with an accuracy level (e.g., referred to as a confidence level).

Further as shown in FIG. 3A, the temporary payroll record electronic image (301) may be scanned from a hand written payment journal created as a temporary record that is eventually replaced by the ATF journal for entering into the general ledger, for example, maintained in the FMA (e.g. QuickBooks™). That is, the temporary payroll record image (301) may be used as an alternative to the cashed check image (300) described above to extract necessary check information. As shown in FIG. 3A, the hand written payment journal is in a tabulated format that includes seven columns, namely financial institution column (311), bank account type column (312), payment date column (313), check number column (314), employee name column (315), check amount column (316), and check memo column (317) configured to store notes or annotations about the corresponding entry. As described above in reference to FIGS. 1 and 2 above, payroll check information can be extracted from the temporary payroll record electronic image (301) when a cashed check image (300) is unavailable, or as an alternative form of extracting necessary information, using optical character recognition and optical handwriting recognition techniques. Those skilled in the art will appreciate that such a recognition result of the image (301) may be associated with an accuracy level.

Figure 3B:
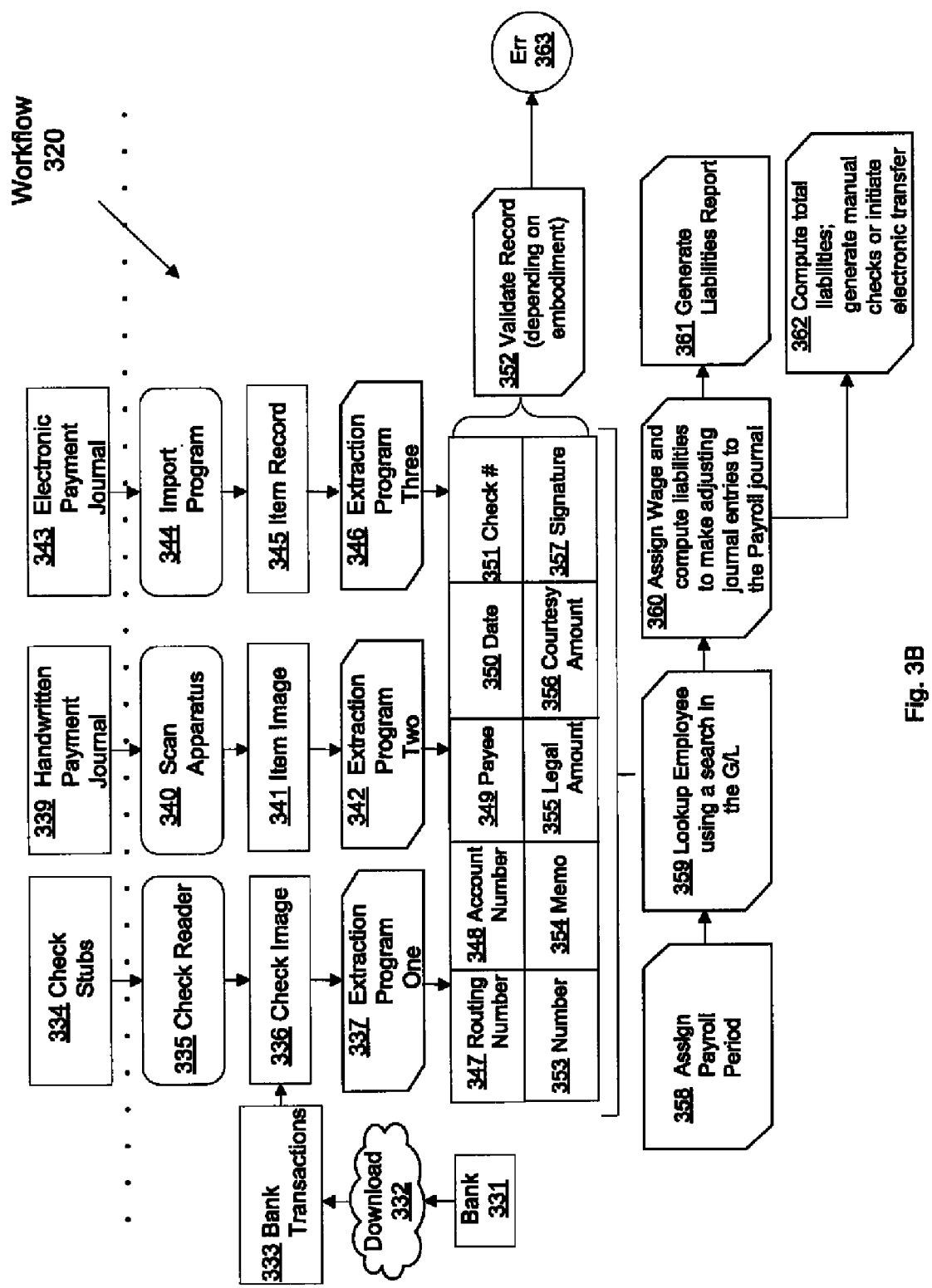

FIG. 3B depicts an example workflow (320) to generate the ATF journal from check stubs (334), a hand written payment journal (339), and/or an electronic payment journal (343) collected for one or more payroll periods. In particular, beginning with the work flow when check stubs are employed, the check stubs (334) are processed using check reader (335) to generate the check image(s) (336). Alternatively, the hand written payment journal (339) is processed using the scan apparatus (340) to generate item image(s) (341). In one or more embodiments, the payment journal in electronic format (343) is processed using an import program (344) to generate item record(s) (345). The check reader (335) and the scan apparatus (340) may include an optical scanner, while the import program (344) may be a software parser configured based on the data format of the electronic payment journal (343). In addition, the check image(s) (336) may also be available as part of bank transactions (333) (i.e., OLB data) obtained by downloading (332) financial data from the bank (331) used by the employer to issue the payroll checks.

In turn, the check image(s) (336), the item image(s) (341), and/or the item record(s) (345) are processed using extraction program one (337), extraction program two (342), and/or extraction program three (346), respectively, to generate example payroll check information elements. Example payroll check information elements may include routing number (347), account number (348), payee (349), date (350), check number (351), record number (353), memo (354), legal amount (355), courtesy amount (356), and signature (357). For example, extraction program one (337) or extraction program two (342) may use optical character recognition and/or optical hand writing recognition techniques, while extraction program three (346) may be a software parser configured based on the particular data format of the item record(s) (345). Typically, a particular input source (i.e., one of bank transactions (333), check stubs (334), hand written payment journal (339), or electronic payment journal (343)) is chosen for an employer to generate ATF payroll journals on an ongoing basis. However, combinations of the various input sources may also be combined. For example, different input sources may be used for different portions of employees. Some of the aforementioned elements of the payroll check information may not be available depending on specific input source chosen.

Once generated, the payroll check information is validated to generate the validated record(s) (352), in one or more embodiments, using the workflow steps 1-5 described below:
1. Verify that the payroll check information contains all required information for recording into an ATF payroll entry. Automatic recognition and validation of the financial institution may be performed using a look-up against the bank routing number (347).
2. Verify that the payroll check information contains a valid signature (357) matching that on file.
3. Identify the issuing financial institution (e.g., a banking institution from which the paychecks were written).
4. Identify the bank account against which the checks were drawn.
5. Verify that there are no discrepancies in the payroll check information (e.g., matching the legal amount (355) to courtesy amount (356), matching the check issuing date (350) against current or recent payroll period, matching the payee name (349) to a valid employee in the employee list, etc.).

If a discrepancy is found in any of the cross checking above, an error (363) is generated, which initiates a manual reconciliation step described in reference to FIG. 3C below. For example, the discrepancy may be identified by comparing a pre-determined threshold to the accuracy level associated with optical recognition performed by extraction program one (337) or extraction program two (342). Specifically, the discrepancy is found when the accuracy level is less than the threshold.

With the payroll check information validated or manual reconciliation completed, the validated record(s) (352) are further processed using the example workflow steps 6-13 described below:
6. Select/assign a payroll date based on the date (350) on which the check was written, as illustrated by workflow element (358). Specifically, payroll check images or a payment journal is processed once each payroll period. However, in some situations, ATF payroll journal may be generated for multiple payroll periods.
7. Identify the employee to whom the check was written (i.e., the payee). For example, the employee may be looked-up using the payee (349) in an employee list maintained in the general ledger (G/L) (workflow element (359)).
8. Identify the check number (351) that was used to pay the employee to retrieve the paid net wage.
9. Enter net wage paid to the employee into an ATF payroll program based on the legal amount (355) and courtesy amount (356) on the identified payroll check.
10. Calculate taxes due for each employee through formulas and/or lookup tables implemented in the ATF program.
11. Generate journal entries for each transaction (i.e., associated with each paycheck image or payment journal entry) for each employee, and enter the journal entries into an accounting application (e.g., QuickBooks™) Workflow steps 8-11 described above are illustrated in element (360).
12. Create a summary report of all payroll liabilities (e.g., tax obligations) for review by the employer, as illustrated in element (361).
13. Using the data computed in workflow elements (360) and (361), generate checks for the total taxes owed to each tax entity (e.g., IRS, EDD, State Franchise board, etc.) for the current payroll period (workflow element (362)). For example, total sum of federal tax withholding, employee and employer portions of the Medical tax, FUTA, etc. for all employees are calculated for the check payable to IRS, total sum of state tax withholding for all employees are calculated for the check payable to State Franchise Board, while total sum of SDI, SUTA, etc. for all employees are calculated for the check payable to EDD.

As noted above, each ATF payroll entry is associated with one or more credit entry and/or debit entry to applicable accounts. Example payroll rules for allocating payroll transactions are described below.

An example payroll rule is a Payee Rule specifying that for every payee that matches an employee, for example through a look-up of the employee on a master list, the check amount is credited to Cash account and debited to Payroll Liabilities account.

Another example payroll rule is an Amount Rule specifying that a reverse look up may be made from the check amount (i.e., the net wage) to identify the employee. For example, TABLE 1 shows how net wage and employee are mapped in a data structure that may be maintained in the ATF program and/or the FMA for applying this rule.

TABLE 1

| Employee | Net Wage |
|---|---|
| Pat Bhatt | $300.22 |
| John Wang | $235.63 |
| ... | ... |

For example, starting with a net wage amount $300.22, example components of the ATF entry including credit entry and debit entry as described in TABLES 2-4 are listed below:
Credit Cash 300.22
Debit Payroll Liabilities 300.22
Credit Social Security Taxes Payable: $22.51 based on formula SS Tax Owed by company—7.5% gross.
Debit Payroll Expenses $22.51

Generally, each payroll allocation disbursement rule is structured as an ordered set having the attributes listed in TABLE 2 below.

Table 2
1) Rule name.
2) Confidence level required to match payee name to an employee in an employee list maintained in the ATF program and/or FMA. This is a function of:
   a) Employee
   b) Check amount
   c) Number of checks that the employee has received
3) List of debit accounts that go on the left side of the account.
4) List of credit accounts that are on the right side of the account.
5) A list of Debit allocation functions that specify how the debit amounts should be allocated.
6) A list of Credit allocation functions that specify how the credit amounts should be allocated.
7) All debit allocations should equal the check amount.
8) All credit allocations should equal the check amount.

Example payroll allocation disbursement rules based on the structure depicted in TABLE 2 are given in TABLE 3 and TABLE 4 below.

Table 3
Rule Name: "FULL-TIME STAFF PAYROLL"
1. Match employee to "Employee List"
2. If match="PAT BHATT"
3. Fetch type of employee
4. Fetch associated Debit accounts
5. Fetch associated Credit accounts
6. If confidence of match >0.98 (or whatever be the level desired depending on materiality or amount i.e. greater the amount the higher the required confidence), then
   [from debit and credit associations]
      a. Credit Cash by amount
      b. Debit Payroll Liabilities
      c. Credit Cash by Soc. Security Dues function (fetch calculated value)
      d. Debit Taxes Due.

Table 4
Rule Name: "PART-TIME EMPLOYEE"
1. Match amount to $200
2. Lookup Employee.
3. Fetch employee type.
4. Fetch associated Debit accounts
5. Fetch associated Credit accounts
6. If confidence of match >0.98, then
   a. Credit Cash by amount
   b. Debit Temporary Wages.

Figure 3C:
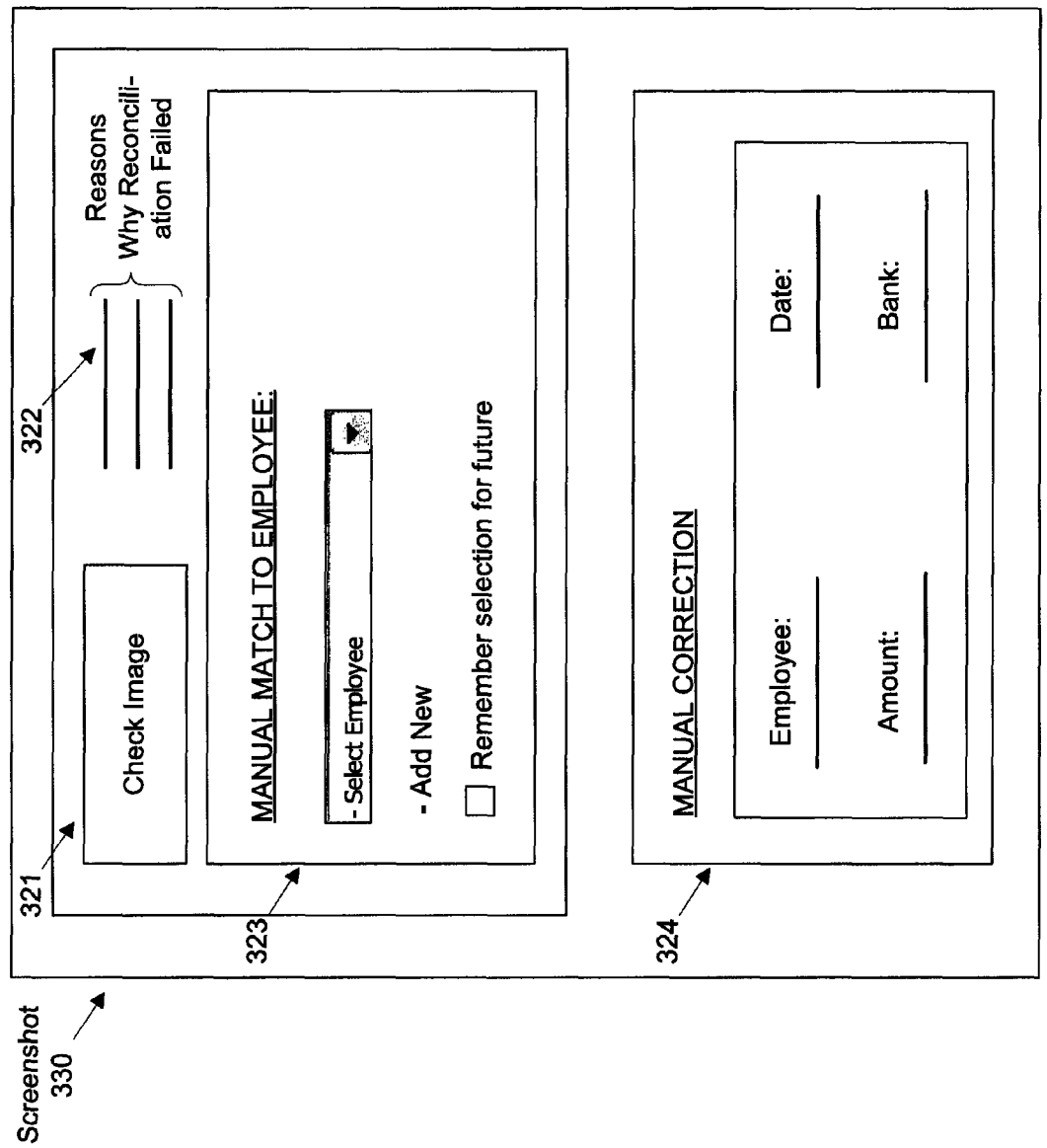

FIG. 3C depicts an example screenshot (330) of a manual reconciliation user interface. Generally, the screenshot (330) is displayed to the accountant user when a discrepancy is found while validating the payroll check information. As shown in FIG. 3C, the screenshot (330) includes the check image (321), description of the validation discrepancy (322), manual employee match dialog box (323) showing an employee selection bar and other pertinent action buttons, and the manual correction dialog box (324) showing data entry fields corresponding to various elements in the payroll check information allowing user correction.

Figure 3D:
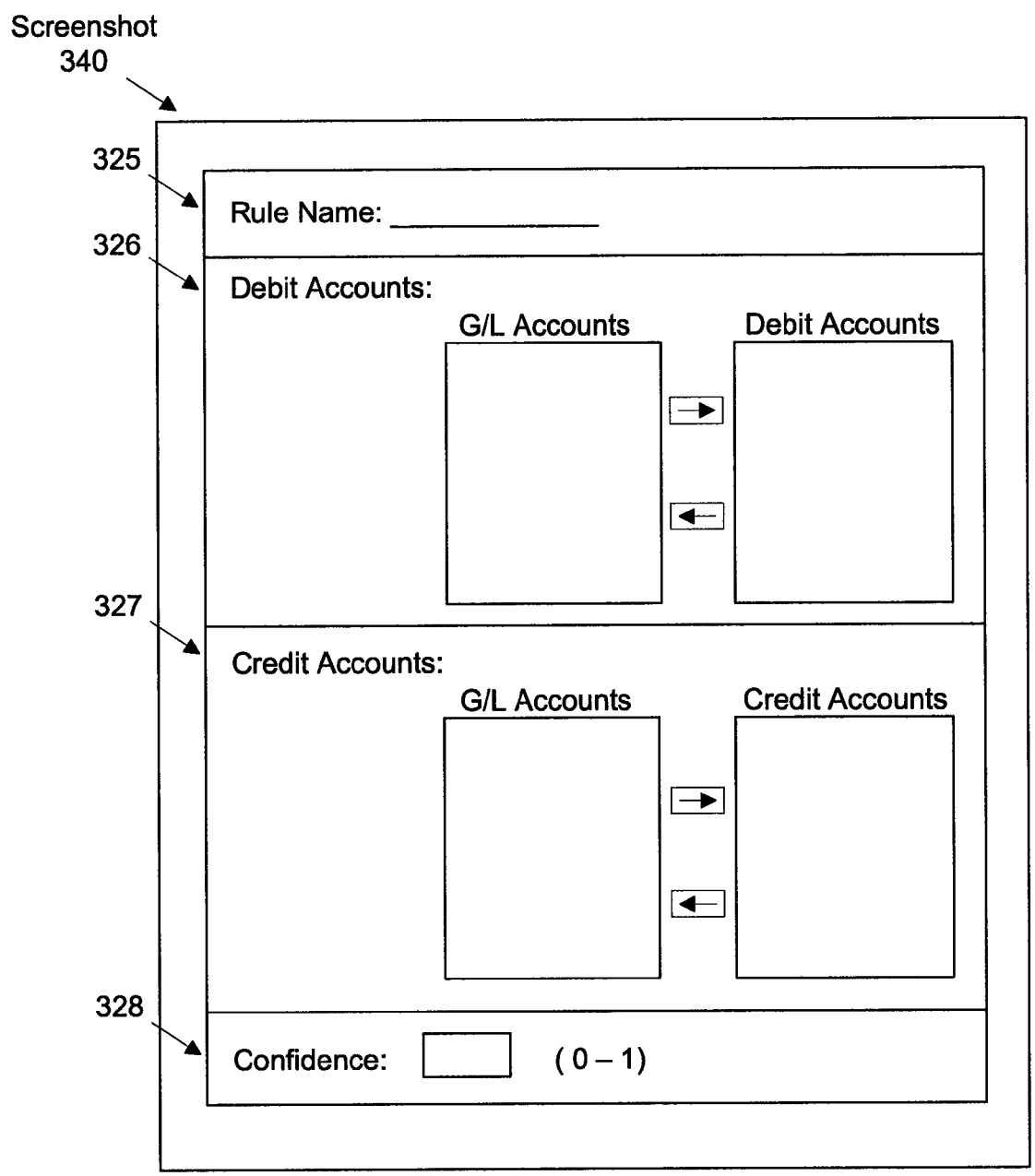

FIG. 3D depicts an example screenshot (340) of payroll rule editing user interface. Generally, the screenshot (340) is displayed to the accountant user to configure or adjust a particular payroll rule such as described in Tables 2 through 4 above. As shown in FIG. 3D, the screenshot (340) includes a data entry field (325) for specifying the payroll rule name, a data entry field (326) for selecting an account from the general ledger (G/L) account list to be added to the debit account(s) associated with the payroll rule specified in the data entry field (325), a data entry field (327) for selecting an account from the general ledger (G/L) account list to be added to the credit account(s) associated with the payroll rule specified in the data entry field (325), and data entry field (328) for specifying an accuracy level threshold associated with the payroll rule specified in the data entry field (325).

Figure 4:
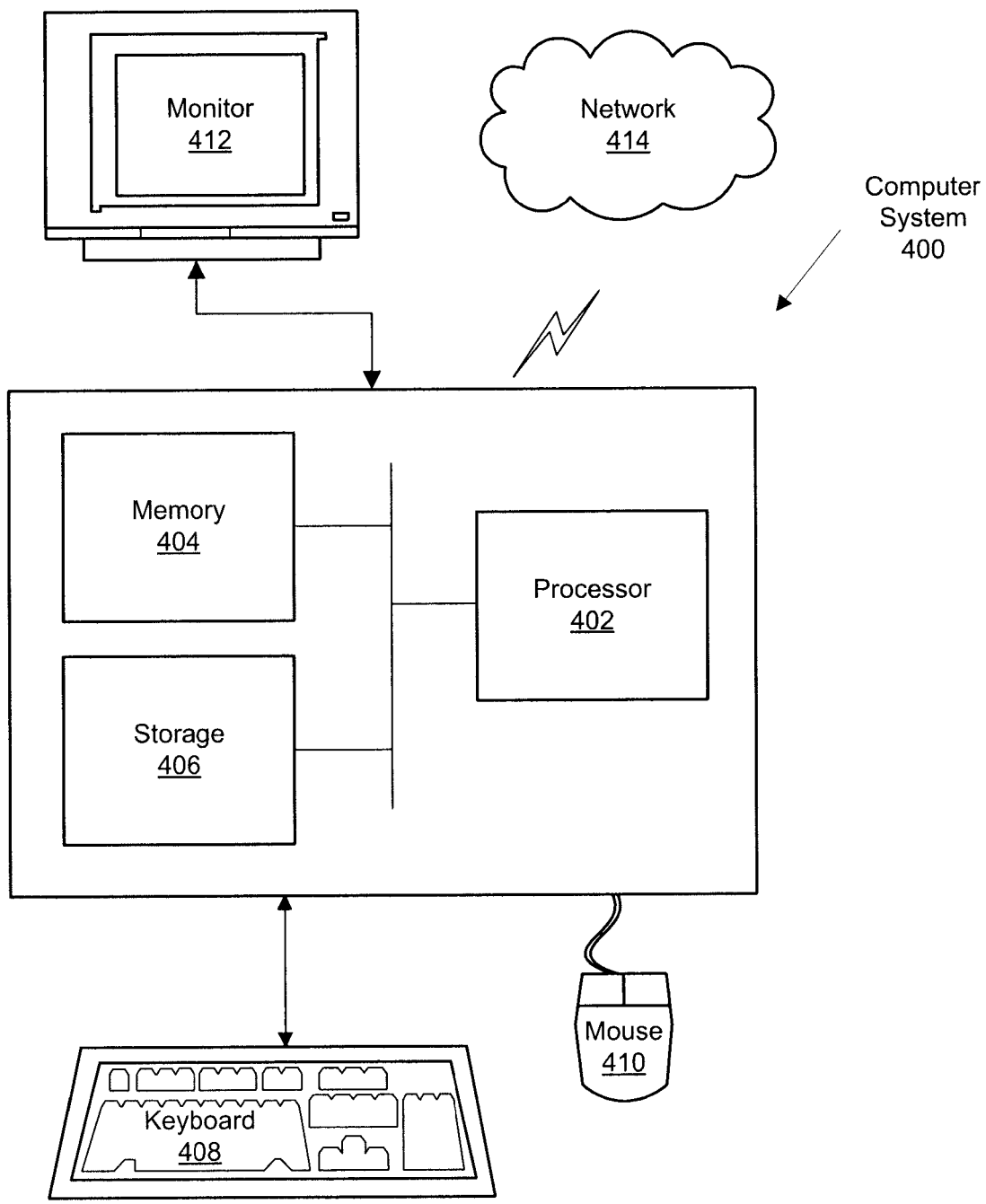
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU) or other hardware processor(s), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms, now known or later developed. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various elements of the computer system (120), the repository (130), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, a punch card, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating an after-the-fact (ATF) payroll journal, comprising:
    identifying a payroll check cashed at a financial institution, wherein the payroll check is issued to an employee during a payroll period for payment via a financial institution;
    determining whether payroll check information is available from a computer file comprising an entry corresponding to the payroll check;
    extracting the payroll check information from the computer file when the payroll check information is available from the computer file;
    obtaining, by a processor of a computer system and when the payroll check information is not available from the computer file, an electronic image associated with the payroll check;
    extracting, by the processor and when the payroll check information is not available from the computer file, the payroll check information from the electronic image;
    validating, using the processor, the payroll check information based on a pre-determined criterion, wherein the payroll check information comprises a payee name, a check date, and a check amount; and
    generating, using the processor, an entry of the ATF payroll journal from the payroll check information based on a pre-determined payroll rule,
    wherein the entry comprises an amount of tax withholding of the employee for the payroll period.

2. The method of claim 1,
    wherein obtaining the electronic image associated with the payroll check comprises at least one selected from a group consisting of obtaining a cashed payroll check image of the payroll check from a computer of the financial institution, obtaining the cashed payroll check image by scanning the cashed payroll check, obtaining a paystub image by scanning a paystub of the payroll check, and obtaining a payment journal image by scanning a payment journal comprising a written entry corresponding to the payroll check, and
    wherein extracting the payroll check information from the electronic image comprises extracting, using optical scanning, the payee name, the check date, and the check amount from at least one selected from a group consisting of the cashed payroll check image, the paystub image, and the payment journal image.

3. The method of claim 2, further comprising:
    identifying the employee by comparing the payee name to an employee list;
    obtaining a profile of the employee in response to identifying the employee;
    identifying the payroll period based on the check date;
    calculating the amount of tax withholding of the employee for the payroll period based on the check amount and the profile of the employee;
    calculating an amount of payroll tax based at least on the amount of tax withholding of the employee; and
    facilitating payment of the payroll tax.

4. The method of claim 3, wherein facilitating payment of the payroll tax comprises:
    generating a payroll tax electronic check for automatic payroll tax payment based on the amount of the payroll tax; and
    submitting the payroll tax electronic check to a tax authority.

5. The method of claim 2, wherein validating the payroll check information based on the pre-determined criterion comprises:
    comparing the payee name to an employee list to generate a comparison;
    validating the payroll check information in response to the comparison indicating no discrepancy; and
    presenting the comparison to a user for manual reconciliation when the comparison indicates a discrepancy,
    wherein the entry of the ATF payroll journal is generated in response to at least one selected from a group consisting of validating the payroll check information and completion of the manual reconciliation.

6. The method of claim 2, wherein validating the payroll check information based on the pre-determined criterion comprises:
    comparing the check date to a payroll period to generate a comparison;
    validating the payroll check information in response to the comparison indicating no discrepancy; and
    presenting the comparison to a user for manual reconciliation when the comparison indicates a discrepancy,
    wherein the entry of the ATF payroll journal is generated in response to at least one selected from a group consisting of validating the payroll check information and completion of the manual reconciliation.

7. The method of claim 2, wherein validating the payroll check information based on the pre-determined criterion comprises:
    comparing a legal amount of the check amount and a courtesy amount of the check amount to generate a comparison;
    validating the payroll check information in response to the comparison indicating no discrepancy; and
    presenting the comparison to a user for manual reconciliation when the comparison indicates a discrepancy,
    wherein the entry of the ATF payroll journal is generated in response to at least one selected from a group consisting of validating the payroll check information and completion of the manual reconciliation.

8. The method of claim 2,
    wherein the payroll check information further comprises a routing number of the financial institution, and
    wherein validating the payroll check information based on the pre-determined criterion further comprises:
        comparing the routing number to a profile of the financial institution to generate a comparison;

validating the payroll check information further in response to the comparison indicating no discrepancy; and presenting the fourth comparison to the user for manual reconciliation when the comparison indicates a discrepancy, wherein the entry of the ATF payroll journal is generated in response to at least one selected from a group consisting of validating the payroll check information and completion of the manual reconciliation.

9. The method of claim 2, further comprising:

annotating the entry of the ATF payroll journal based on at least one selected from a group consisting of a check number of the payroll check, the electronic image of the payroll check, and check memo of the payroll check, wherein the payroll check information further comprises the check number and the check memo.

10. A system for creating an after-the-fact (ATF) payroll journal, comprising:

a memory storing instructions;

a processor operatively coupled to the memory;

a financial management application (FMA) executing on the processor and configured to manage payroll data of an employer;

an after-the-fact (ATF) payroll analyzer executing on the processor configured to execute instructions to:

receive, from a user representing the employer, information identifying a payroll check issued to an employee of the employer during a payroll period for payment via a financial institution, determine whether payroll check information is available from a computer file comprising an entry corresponding to the payroll check;

extract the payroll check information from the computer file when the payroll check information is available from the computer file;

obtain, when the payroll check information is not available from the computer file, an electronic image associated with the payroll check, extract, when the payroll check information is not available from the computer file, the payroll check information from the electronic image, and validate the payroll check information based on a pre-determined criterion, wherein the payroll check information comprises a payee name, a check date, and a check amount;

an ATF payroll generator executing on the processor configured to execute instructions to:

generate an entry of the ATF payroll journal from the payroll check information based on a pre-determined payroll rule, wherein the entry comprises an amount of tax withholding of the employee during the payroll period, and transmit the ATF payroll journal to the FMA as payroll data; and a repository configured to store the electronic image, the payroll check information, and the ATF payroll journal.

11. The system of claim 10, wherein obtaining the electronic image associated with the payroll check comprises at least one selected from a group consisting of obtaining a cashed payroll check image of the payroll check from a computer of the financial institution, obtaining the cashed payroll check image by scanning the cashed payroll check, obtaining a paystub image by scanning a paystub of the payroll check, and obtaining a payment journal image by scanning a payment journal comprising a written entry corresponding to the payroll check, and wherein extracting the payroll check information from the electronic image comprises extracting, using optical scanning, the payee name, the check date, and the check amount from at least one selected from a group consisting of the cashed payroll check image, the paystub image, and the payment journal image.

12. The system of claim 11, wherein the ATF payroll generator is further configured to execute instructions to:

identify the employee by comparing the payee name to an employee list;

obtain a profile of the employee in response to identifying the employee;

identify the payroll period based on the check date;

calculate the amount of tax withholding of the employee for the payroll period based on the check amount and the profile of the employee;

calculate an amount of payroll tax based at least on the amount of tax withholding of the employee; and facilitate payment of the payroll tax.

13. The system of claim 12, wherein facilitating payment of the payroll tax comprises:

generating a payroll tax electronic check for automatic payroll tax payment based on the amount of the payroll tax; and submitting the payroll tax electronic check to a tax authority.

14. The system of claim 11, wherein the ATF payroll generator is further configured to execute instructions to:

annotate the entry of the ATF payroll journal based on at least one selected from a group consisting of a check number of the payroll check, the electronic image of the payroll check, and check memo of the payroll check, wherein the payroll check information further comprises the check number and the check memo.

15. Computer readable storage medium storing instructions for creating an after-the-fact (ATF) payroll journal, the instructions when executed by a computer comprising functionality to:

identify a payroll check cashed at a financial institution, wherein the payroll check is issued to an employee during a payroll period for payment via a financial institution;

determine whether payroll check information is available from a computer file comprising an entry corresponding to the payroll check;

extract the payroll check information from the computer file when the payroll check information is available from the computer file;

obtain, when the payroll check information is not available from the computer file, an electronic image associated with the payroll check;

extract, when the payroll check information is not available from the computer file, the payroll check information from the electronic image;

validate the payroll check information based on a pre-determined criterion, wherein the payroll check information comprises a payee name, a check date, and a check amount; and generate an entry of the ATF payroll journal from the payroll check information based on a pre-determined payroll rule, wherein the entry comprises an amount of tax withholding of the employee for the payroll period.

16. The computer readable storage medium of claim 15, wherein obtaining the electronic image associated with the payroll check comprises at least one selected from a group consisting of obtaining a cashed payroll check image of the payroll check from a computer of the financial institution, obtaining the cashed payroll check image by scanning the cashed payroll check, obtaining a paystub image by scanning a paystub of the payroll check, and obtaining a payment journal image by scanning a payment journal comprising a written entry corresponding to the payroll check, and wherein extracting the payroll check information from the electronic image comprises extracting, using optical scanning, the payee name, the check date, and the check amount from at least one selected from a group consisting of the cashed payroll check image, the paystub image, and the payment journal image.

17. The computer readable storage medium of claim 16, the instruction when executed by the computer further comprising functionality to:

identify the employee by comparing the payee name to an employee list;

obtain a profile of the employee in response to identifying the employee;

identify the payroll period based on the check date;

calculate the amount of tax withholding of the employee for the payroll period based on the check amount and the profile of the employee;

calculate an amount of payroll tax based at least on the amount of tax withholding of the employee; and facilitate payment of the payroll tax.

18. The computer readable storage medium of claim 17, wherein facilitating payment of the payroll tax comprises:

generating a payroll tax electronic check for automatic payroll tax payment based on the amount of the payroll tax; and submitting the payroll tax electronic check to a tax authority.

19. The computer readable storage medium of claim 16, wherein validating the payroll check information based on the pre-determined criterion comprises:

comparing the payee name to an employee list to generate a comparison;

validating the payroll check information in response to the comparison indicating no discrepancy; and presenting the comparison to a user for manual reconciliation when the comparison indicates a discrepancy, wherein the entry of the ATF payroll journal is generated in response to at least one selected from a group consisting of validating the payroll check information and completion of the manual reconciliation.

20. The computer readable storage medium of claim 16, wherein validating the payroll check information based on the pre-determined criterion comprises:

comparing the check date to a payroll period to generate a comparison;

validating the payroll check information in response to the comparison indicating no discrepancy; and presenting the comparison to a user for manual reconciliation when the comparison indicates a discrepancy, wherein the entry of the ATF payroll journal is generated in response to at least one selected from a group consisting of validating the payroll check information and completion of the manual reconciliation.

21. The computer readable storage medium of claim 16, wherein validating the payroll check information based on the pre-determined criterion comprises:

comparing a legal amount of the check amount and a courtesy amount of the check amount to generate a comparison;

validating the payroll check information in response to the comparison indicating no discrepancy; and presenting the comparison to a user for manual reconciliation when the comparison indicates a discrepancy, wherein the entry of the ATF payroll journal is generated in response to at least one selected from a group consisting of validating the payroll check information and completion of the manual reconciliation.

22. The computer readable storage medium of claim 16, wherein the payroll check information further comprises a routing number of the financial institution, and wherein validating the payroll check information based on the pre-determined criterion further comprises:

comparing the routing number to a profile of the financial institution to generate a comparison;

validating the payroll check information further in response to the comparison indicating no discrepancy; and presenting the fourth comparison to the user for manual reconciliation when the comparison indicates a discrepancy, wherein the entry of the ATF payroll journal is generated in response to at least one selected from a group consisting of validating the payroll check information and completion of the manual reconciliation.

23. The computer readable storage medium of claim 16, the instruction when executed by the computer further comprising functionality to:

annotate the entry of the ATF payroll journal based on at least one selected from a group consisting of a check number of the payroll check, the electronic image of the payroll check, and check memo of the payroll check, wherein the payroll check information further comprises the check number and the check memo.

* * * * *